United States Patent [19]

Bristol

[11] 4,321,904
[45] Mar. 30, 1982

[54] INTERNAL COMBUSTION ENGINE WITH AUXILIARY COMBUSTION CHAMBER

[76] Inventor: Robert D. Bristol, P.O. Box 337, Beulah, Mich. 49617

[21] Appl. No.: 130,727

[22] Filed: Mar. 17, 1980

Related U.S. Application Data

[63] Continuation-in-part of Ser. No. 950,368, Oct. 11, 1978, Pat. No. 4,211,082.

[51] Int. Cl.³ .................... F02B 33/00; F02D 23/00; F02B 75/04
[52] U.S. Cl. .................................. 123/559; 123/37; 123/48 R; 123/78 R; 123/311
[58] Field of Search .............. 123/37, 311, 559, 78 R, 123/78 A, 48 R, 78 AR

[56] References Cited

U.S. PATENT DOCUMENTS

| | | | |
|---|---|---|---|
| 546,481 | 9/1895 | Bary | 123/68 |
| 680,616 | 8/1901 | Pugh | 123/65 B |
| 705,201 | 7/1902 | Brown | 123/65 B |
| 714,180 | 11/1902 | Hendricks | 123/65 B |
| 1,478,357 | 12/1923 | Powell | 123/68 |
| 1,751,385 | 3/1930 | Beaudry | 123/68 |
| 2,151,218 | 3/1939 | Lutz | 123/32 |
| 2,551,478 | 5/1951 | Wagers | 123/70 |
| 2,983,263 | 5/1961 | Heintz | 123/191 R |
| 3,675,630 | 7/1972 | Stratton | 123/70 |
| 3,897,769 | 8/1975 | Soelin | 123/191 R |

FOREIGN PATENT DOCUMENTS

| | | | |
|---|---|---|---|
| 699742 | 2/1931 | France | 123/78 AR |
| 4984 | of 1899 | United Kingdom | 123/37 |
| 815494 | 6/1959 | United Kingdom | 60/605 |

*Primary Examiner*—Wendell E. Burns
*Attorney, Agent, or Firm*—Price, Heneveld, Huizenga & Cooper

[57] ABSTRACT

An internal combustion engine includes a power cylinder, a power piston reciprocating therein and an auxiliary piston reciprocating within an auxiliary cylinder. Passages connect the upper end of the auxiliary cylinder to a combustion chamber and a source of air. Rotating valves or conventional reciprocating valves control the intake of an air/fuel mixture into the supercharging cylinder, transfer the mixture to the main or power cylinder and exhaust combusted gases from the main cylinder. An expansion chamber is placed in communication with the power cylinder at the beginning of the power stroke to permit an overcharge of air/fuel mixture to be transferred to the combustion chamber.

12 Claims, 8 Drawing Figures

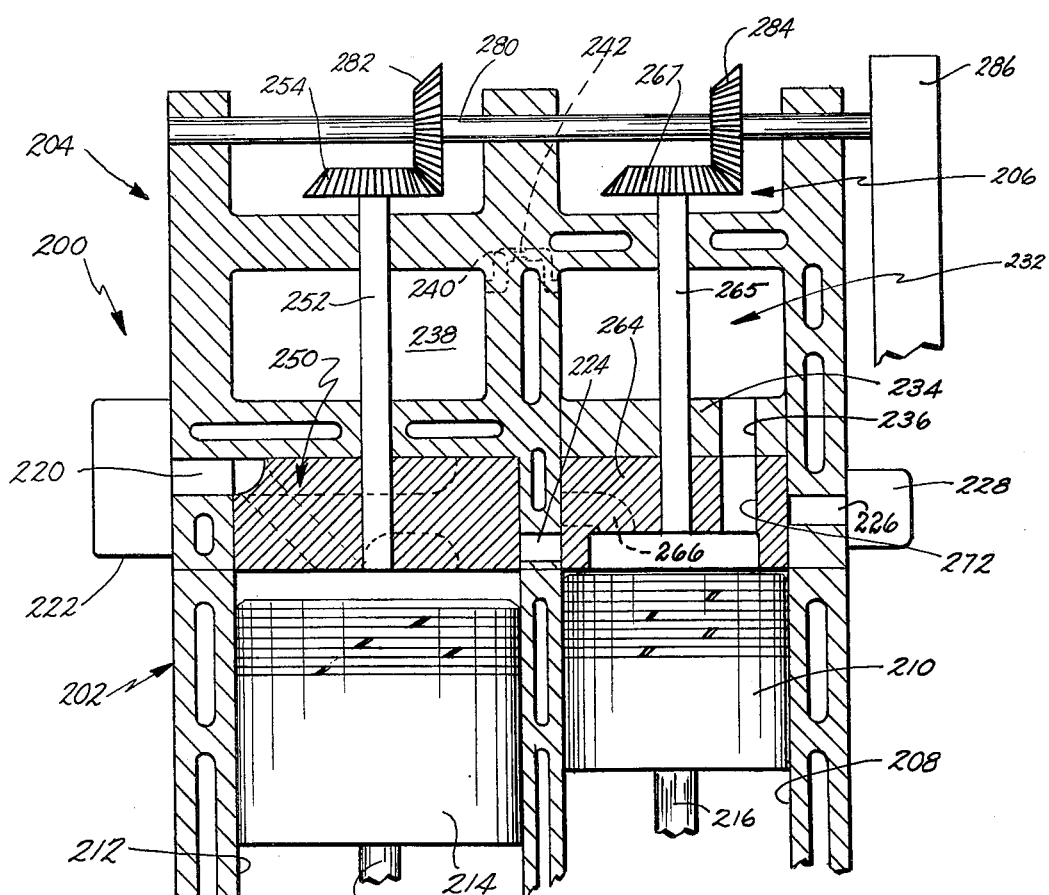
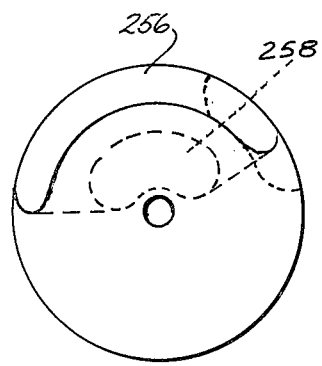
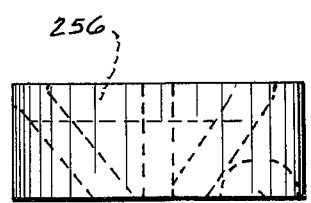
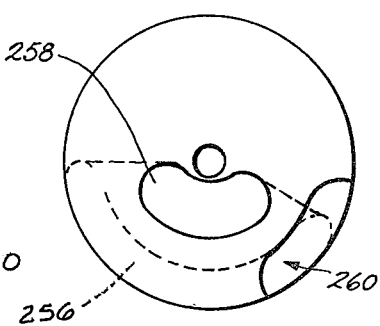
Fig. 2.
Fig. 3.
Fig. 4.
Fig. 5.

INTERNAL COMBUSTION ENGINE WITH AUXILIARY COMBUSTION CHAMBER

CROSS REFERENCE TO RELATED APPLICATION

This application is a continuation-in-part of copending Application Ser. No. 950,368 filed Oct. 11, 1978 now U.S. Pat. No. 4,211,082 of July 8, 1980.

BACKGROUND OF THE INVENTION

The present invention relates to internal combustion engines and, more particularly, to a supercharged, two-cycle internal combustion engine.

Heretofore, various proposals have been made for increasing the thermal and mechanical efficiency of internal combustion engines. In a typical internal combustion engine, as speed increases, the amount of air/fuel mixture taken into the engine on an intake stroke or the volumetric efficiency of the engine will decrease. In normally aspirated engines, only atmospheric pressure acts to force the air/fuel mixture into the engine during the intake stroke. As engine speeds increase, the amount of air/fuel mixture entering the engine rapidly decreases. This reduction in volumetric efficiency reduces the power output and the torque output of the engine at higher engine speeds. Further, in order to insure more complete combustion of the air/fuel mixture within the combustion chamber, the ignition timing is commonly advanced. Ignition occurs prior to the power piston reaching its top dead center position. As a result, the peak pressures within the cylinder acting on the power piston during the power stroke do not occur at the optimum time for maximum torque. As the piston moves past top dead center and towards the bottom dead center position, the pressures within the cylinder fall off rapidly.

In typical two-stroke engines in which a power stroke occurs every two piston strokes or every crankshaft rotation, maximum efficiency and peak powers are not achieved due primarily to incomplete exhaust of the burned air/fuel mixture. In a typical piston ported, two-cycle engine, an air/fuel mixture enters the crankcase of the engine as the piston moves up to a top dead center position. As the piston moves downwardly during the power stroke, the air/fuel mixture in the crankcase is compressed and transferred through transfer passages to transfer ports. The piston clears the transfer ports and the air-fuel mixture enters the cylinder above the piston. At the same time, the piston has cleared exhaust ports to permit the burnt or spent gases to exit the engine. The incoming air/fuel mixture does not efficiently scavenge the combustion chamber or, under certain conditions, some of the incoming air/fuel mixture may exit the combustion chamber through the exhaust port prior to its being closed by the piston. This mixing of the fresh air/fuel mixture charge with the burned gases and/or the loss of the charge through the exhaust port significantly reduces the power output of the two-cycle engine.

Various proposals have heretofore been made to increase the volumetric efficiency, insure more complete scavenging of the exhaust gases or to delay the achievement of peak pressures during the power stroke in order to increase the torque output of the engine. Such prior proposals have included the design of special piston configurations in order to provide staged or delayed pressure increases to compensate for the combustion chamber increase in cubic capacity during the power stroke. An example of one such piston construction may be found in U.S. Pat. No. 3,897,769, issued Aug. 5, 1975, to Jozlin, and entitled SECONDARY COMBUSTION CHAMBERS FOR INTERNAL COMBUSTION ENGINES. Another example of a modified piston construction to achieve similar results may be found in U.S. Pat. No. 2,151,218, issued Mar. b 21, 1939, to Lutz, and entitled DIESEL ENGINE. These constructions, while achieving higher average or mean effective pressures, have not solved the problems related to volumetric efficiency and incomplete scavenging of the combustion chamber.

Other proposals to increase the efficiency of two-cycle engins have included the use of supercharger devices. The superchargers increase the amount of air/fuel mixture which is delivered to the engine and, therefore, boost the engine power output. Superchargers have been constructed which include a compressor and a turbine linked together by a common shaft. The turbine is rotated by the exhaust gases from the engine. The compressor thereby delivers a compressed charge to the engine cylinders. The supercharger increases the charge delivered to the engine, increasing the volumetric efficiency and increases the power developed during the power stroke.

U.S. Pat. No. 2,551,478, issued May 1, 1951, to Wagers, and entitled SUPERCHARGED TWO CYCLE ENGINE WITH RETARDED FIRING discoses another type of a supercharger used with two cycles. The engine disclosed in this patent includes a main piston, a cylinder and a crankshaft arrangement and an ignition firing means which is adapted to initiate combustion after the piston has moved a considerable distance beyond top dead center. A piston/cylinder and bypass arrangement are included to force air into the main cylinder as the piston is moving beyond top dead center to compensate for compression loss due to piston movement and to supercharge the main cylinder prior to initiation of combustion. The supercharger piston is moved upwardly in a compression and transfer stroke by a cam secured to the engine crankshaft.

U.S. Pat. No. 1,751,385, issued Mar. 18, 1930, to Beaudry, and entitled INTERNAL COMBUSTION ENGINE, discloses a construction wherein a power cylinder receives a compressed air/fuel mixture from an auxiliary piston cylinder arrangement. The auxiliary piston is connected to the engine crankshaft through a connecting rod.

U.S. Pat. No. 3,675,630, issued July 11, 1972, to Stratton, and entitled ENGINE, also discloses a construction wherein a power generating cylinder receives a compressed air/fuel mixture from an auxiliary fluid compressing cylinder. The mixture or charge is ignited after the power piston in the power generating cylinder has passed and is moving away from its top dead center position. Electrically energizable solenoids are included for operating intake, exhaust and transfer valves.

British Pat. No. 815,494, published June 24, 1959, discloses a similar two-cycle internal combustion engine which, however, employs the exhaust gases from the power cylinder to operate an air pump. This method of supercharging should increase engine overall efficiency since normally lost energy from the hot exhaust gases is employed as in the rotary or turbine type compressor superchargers. in one embodiment illustrated in this patent, a power piston reciprocates within a piston cylinder. The cylinder defines an intake and an exhaust port. A valve controls passage of the exhaust gases from the exhaust port to an exhaust manifold. When the valve is in a closed position, the exhaust gases act upon a piston of reduced diameter which is connected to a double acting piston of larger diameter. Valves control intake, compression and exhaust of air from the double acting piston cylinder. A smaller piston is also connected to the large piston and is received within a smaller cylinder. The smaller piston compresses air within the smaller cylinder to cushion movement of the double acting piston and also to return the double acting piston to its initial position when the exhaust valve is opened to permit exhaust gas to pass to an exhaust manifold.

SUMMARY OF THE INVENTION

A need exists for an improved internal combustion engine of the two-cycle type wherein increased volumetric efficiency is achieved, an increased charge is delivered to a power piston cylinder, the firing of the charge is delayed to achieve increased power output and a more complete exhaust is achieved from the power piston cylinder to prevent mixing of the spent gases with the fresh charge.

The improved internal combustion engine in accordance with the present invention essentially includes a power cylinder, a power piston reciprocating within the power cylinder and connected to an output crank, an intake port opening and an exhaust port opening into a combustion chamber. An auxiliary, secondary or charging cylinder has a charge piston reciprocating therein. Means are provided for defining an intake passage opening into the auxiliary cylinder, a transfer passage connecting the auxiliary cylinder to the combustion chamber and an exhaust passage connected to atmosphere. Valving means are provided for controlling transfer of gases through the various passages.

In order to prevent detonation and to reduce the stresses on the engine, a charge expansion or relief chamber is provided and which includes a port opening into the combustion chamber. Valve means control opening of the port until after the power piston has moved past its top dead center position. The charge expansion chamber permits an overcharge to be transferred to the combustion chamber, thereby increasing the volumetric efficiency. The power output is increased because the pressure is greater and the rate of decrease in pressure is reduced in the cylinder. Detonation is prevented as well as possible damage to the engine components.

BRIEF DESCRIPTION OF THE DRAWINGS

FIG. 2 is an elevational view in section of an alternative two-cycle internal combustion engine in accordance with the present invention;

FIG. 3 is a top, plan view of a rotary valve disposed in the supercharging cylinder;

FIG. 4 is a side elevational view of the rotary valve of FIG. 3;

FIG. 5 is a bottom, plan view of the rotary valve of FIG. 3;

DETAILED DESCRIPTION OF THE PREFERRED EMBODIMENTS

Figure 1:
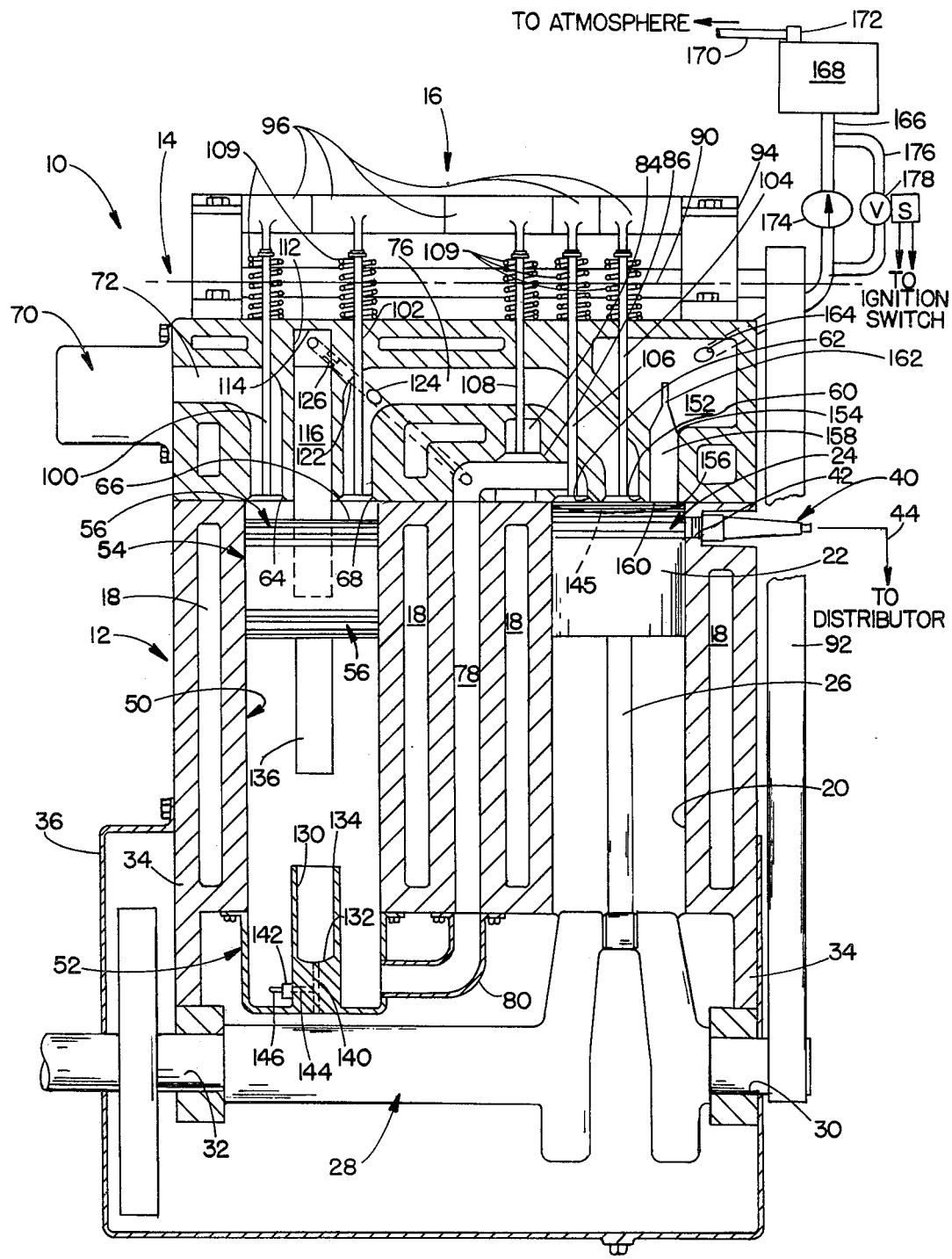
FIG. 1 is an elevational view in section of a two-cycle internal combustion engine in accordance with the present invention.

A preferred embodiment of an internal combustion engine of the two-cycle type in accordance with the present invention is illustrated in the drawings and generally designated 10. The engine 10 includes a cylinder block 12, a cylinder head 14 and a valve train or valving means 16.

Cylinder block 12 defines water jacket passages 18 connectable to a conventional cooling system in a manner well known in the art. Cylinder block 12 also defines a power cylinder 20 closed at its top end by the cylinder head 14. A power piston 22 reciprocates within power cylinder 20. Power piston 22 includes conventional ring grooves and compression and oil control rings, generally designated 24. Piston 22 is connected in a conventional fashion through a connecting rod 26 to a rotating output crank 28. Output crank 28 is journaled at its ends 30, 32 in a conventional fashion to cylinder block end walls 34. An oil pan 36 is secured to the cylinder block 12, encloses crank 28 and defines an oil sump in a conventional fashion.

A conventional sparkplug or spark igniter 40 is threadably received within a recess or hole 42 which opens through the sidewall of cylinder 20. For illustrative purposes, the sparkplug 40 has been illustrated in a position rotated 90° from its normal position. Sparkplug 40 is connected to a conventional ignition system which may include a distributor (not shown) through a suitable high tension wire 44.

In the embodiment shown, cylinder block 12 also defines an auxiliary, secondary or charge cylinder 50. The charge cylinder 50 is closed at one end by the cylinder head 14 and at the other end by a cap member 52. Reciprocating within auxiliary cylinder 50 is a free floating, double acting, charge, secondary or auxiliary piston 54. Piston 54 includes ring grooves and suitable compression and oil control rings 56 at each end thereof.

Cylinder head 14 defines, with power cylinder 20 and power piston 22, a combustion chamber between the top of the piston 22 and the undersurface of the cylinder head 14. Cylinder head 14 defines an intake port 60 opening into the combustion chamber and an exhaust port 62 similarly opening into the combustion chamber. The cylinder head defines a charge or air/fuel mixture intake port 64 opening into the top of the auxiliary cylinder 50 above the upper face 66 of piston 54. Head 14 also defines a charge or air/fuel mixture transfer port 68 similarly opening into the top end of cylinder 50. Intake port 64 may be connected to a source of air and fuel, such as a conventional carburetor 70, through a passage 72 defined by the cylinder head. Transfer port 68 is connected to intake port 60 of the power piston cylinder 20 through a charge transfer passage 76 defined by the cylinder head. Exhaust port 62 is connected to the lower side of auxiliary cylinder 50 through a passage 78 defined in part by the cylinder head 14 and by a tubular member 80 which opens into the lower end of the cylinder 50 defined by the cap member 52. An atmospheric exhaust passage 84 is defined by the cylinder head 14. The atmospheric exhaust passage 84 is connected to a suitable exhaust pipe and muffler (not shown) in a conventional fashion. Cylinder head 14 defines an atmospheric exhaust port 86 which communicates the atmospheric exhaust passage with the exhaust transfer passage 78.

Valving means 16 includes a camshaft 90 rotatably supported on the cylinder head 14. Camshaft 90 may be rotated through a timing belt 92 which is driven by crank 28 in a conventional fashion. Supported above camshaft 90 is a rocker arm shaft 94 supporting a plurality of rocker arms 96. Each of the rocker arms engages a respective one of a plurality of valves which control passage of fluid through the above described passages. As illustrated, the valve train 16 includes an intake valve 100 which opens and closes charge intake port 64, a transfer valve 102 which opens and closes transfer port 68, a combustion chamber intake valve 104 which opens and closes power cylinder intake port 60 and an exhaust valve 106 which opens and closes power cylinder exhaust port 62. An atmospheric exhaust valve 108 controls the opening and closing of atmospheric exhaust port 86. Each of the valves is biased to a closed position by suitable valve springs 109 in a conventional fashion. While a mechanical valving mechanism has been illustrated, solenoid operated valves could be employed to control the opening and closing of the various ports. A solenoid operated valving system including a switching mechanism of the type illustrated in U.S. Pat. No. 3,675,630, for example, could be employed. To the extent necessary, the disclosure of this patent is hereby incorporated by reference.

As illustrated, the cylinder head aso defines a return or bounce cylinder 112 having a closed end 114. Return cylinder 112 is coaxially aligned with and is of smaller diameter than auxiliary cylinder 50. Coaxially aligned with and extending upwardly from auxiliary piston 54 is a return or bounce piston 116. Return or bounce piston 116 is slidably disposed within return cylinder 112. Cylinder 112 and elongated piston 116, as explained in detail below, define a fluid spring biasing auxiliary piston 54 towards its bottom dead center position and effectively controlling upward movement of the auxiliary piston.

Cylinder head 14 also defines a gas transfer passage 122 which extends between exhaust transfer passage 78 to a point adjacent closed end 114 of return cylinder 112. Passage 122 places return cylinder 112 in communication with exhaust passage 78. Disposed within transfer passage 122 is a check valve 124 and a variable restrictor 126. Check valve 124 may be of conventional construction and could be a reed valve or a ball check valve, for example. Valve 124 prevents reverse flow of exhaust gases from cylinder 112 to exhaust transfer passage 78. Variable restrictor 126 may be of conventional construction and could be of the needle valve type. Valve 126 controls the rate of flow of exhaust gases from passage 78 to cylinder 112 and, hence, controls the spring force or pressure exerted on piston 116. Restrictor 126 is preferably adjustable externally of the engine. The fluid spring defined by cylinder 112 and piston 116 biases piston 54 downwardly in order to force exhaust gases in a reverse direction through passage 78 and out through atmospheric exhaust passage 84.

In order to cushion the downward movement of auxiliary piston 54 and to stop the downward movement to prevent damage to the piston, another fluid spring is provided at the lower end of the cylinder 50. As seen in the drawings, cap member 52 defines an upwardly directed cushioning cylinder 130 having a lower end 132 and an upper, open end 134. Cylinder 130 is coaxially aligned with the auxiliary cylinder 50. Extending downwardly from and coaxially aligned with piston 54 is a cushioning piston 136. Cushioning piston 136 is similar to return piston 116 in that it is an elongated, rod-like member of a diameter substantially less than the diameter of double acting, free floating piston 54. Upon downward movement of piston 54, piston 136 will enter cylinder 130 and compress fluid contained within the cylinder. Compression of the fluid cushions and stops the downward movement of piston 54.

It is presently preferred that provision be made for controlling the spring rate or force exerted on the piston 136 by the gas being compressed within the cylinder 130. A bleed passage 140 extends from end 132 of cylinder 130 into the crankcase defined by oil pan 36. A variable restrictor in the form of a needle valve 142, for example, is threadably disposed in a passage 144 which intersects the bleed passage 140. Rotation of needle valve 142 effectively varies the restriction in passage 140 and, hence, the spring rate or cushioning ability of the gases compressed within cylinder 130 by piston 136. A control member 146 is connected to needle valve 142 and extends externally of the cylinder block in order to permit external control of valve 142.

OPERATION

The various components of the engine as illustrated in the drawings are positioned at the beginning of the power stroke of power piston 22. Power piston 22 is in its top dead center position and auxiliary piston 54 is approaching its top dead center position. Intake valve 100 is closed, transfer valve 102 is just beginning to open, exhaust valve 106 is closed and power cylinder intake valve 104 is just beginning to open. Atmospheric exhaust valve 108 is closed. Auxiliary piston 54 at this point in the cycle has caused an intake of an air-fuel charge into the auxiliary cylinder and has compressed the air/fuel charge. As power piston 22 moves beyond its top dead center position, valves 102 and 104 open, permitting transfer of the compressed charge into the combustion chamber defined by cylinder 20, cylinder head 14 and piston 22. As piston 22 moves substantially beyond top dead center to a point of optimum mechanical efficiency and with valves 104, 106 closed and valves 100, 108 opening, an ignition timing system causes sparkplug 40 to ignite the supercharged, compressed air mixture.

As the power piston 22 starts to move to bottom dead center, the valve 102 closes and gases compressed within cylinder 112 will act on piston 116 and drive the auxiliary piston 54 toward bottom dead center. Piston 136 enters cylinder 130, cushions and stops the movement of the piston. During the downward movement of piston 54, exhaust gases which had forced the piston upwardly to compress the charge are moved in a reverse direction through passage 78 out port 86 as a result of opening of the atmospheric exhaust valve 108. These exhaust gases are exhausted to atmosphere.

As piston 22 passes through bottom dead center and begins its exhaust stroke, valve 100 closes and exhaust valve 106 opens. Valve 108 also closes. The exhaust gases are propelled through exhaust port 62, exhaust transfer passage 78 and into the lower side of the auxiliary cylinder 50. The exhaust gases act on the undersurface of auxiliary piston 54, forcing the piston upwardly. During the previous downward movement of piston 54, valve 102 closed and valve 100 opened, permitting a charge to enter the cylinder 50 due to the negative pressure produced by downward motion of piston 54. As piston 54 moves upwardly under the pressure exerted thereon by the exhaust gases, it will compress the charge. The cycle is then repeated. When the exhaust gases are flowing through passage 78, they will also flow through passage 122 and into the cylinder 112.

Previous attempts to employ fluid spring devices to control the motion of a free floating auxiliary piston were not felt to be totally satisfactory. Due to manufacturing tolerances and sealing problems, the gas or fluid within the return fluid spring could bleed off and proper operation could not be obtained. Further, the spring rate and force exerted on the auxiliary piston could not be adequately controlled in order to properly control timing of auxiliary piston 54. Inclusion of passage 122 and variable restrictor 126 obviates these problems. Further, overall mechanical efficiency and thermal efficiency of the engine are increased from that heretofore obtained since additional thermal energy is being employed from the exhaust gases to perform work.

It is presently preferred that power piston 22, connecting rod 26 and crank 28 be dimensioned so that essentially zero clearance is obtained when the power piston 22 is in its top dead center position. Depressions 145 may be formed in the top of the piston in order to provide for valve clearance. It is preferred, however, that such depressions be kept to a minimum in order to minimize the clearance volume in the combustion chamber. Since the charge is compressed by auxiliary piston 54, the normally provided clearance volume may be reduced. Only a clearance necessary to prevent contact with the valves and to compensate for manufacturing tolerances need be provided.

As a result of this preferred construction, essentially complete exhaust of the combustion gases is obtained from the combustion chamber of the power piston cylinder. This essentially complete removal of the combustion gases alleviates the problems heretofore experienced with respect to the mixing of combustion gases with the fresh air/fuel charge and resulting power loss. This should insure more complete combustion during the power stroke and a significant increase in the power output of the two-cycle engine.

AUXILIARY CHAMBER

A relief or auxiliary chamber 152 (FIG. 1) permits dimensioning of the auxiliary piston to compress and transfer a significant overcharge to the power piston. Auxiliary chamber 152 is defined by cylinder head 14 and includes an elongated passage 154 having a port 156 opening into the top of cylinder 20. Extending upwardly from the crown of piston 22 is a control valve means 158. Control valve means 158 is a generally bottle-shaped member having a base 160 formed integral with or secured to the top of piston 22 and terminating in a tapered or reduced diameter neck 162. As the overcharge is transferred into the combustion chamber, piston 22 moves considerably past its top dead center position and ignition occurs, valve means 158 will gradually open port 156 to permit relief of the excess pressure into the relief or auxiliary chamber 152. The provision of such a chamber permits the pressure curve generated within the combustion chamber to be smoothed out and spread out over a greater degree of crank rotation. This relief of pressure eliminates and/or prevents detonation due to overcompression of the charge. Such reduces the occurrence or possibility of severe damage to the engine components due to detonation. The chamber, it is believed, also permits the use of low octane rated fuel in the engine. Although chamber 152 is illustrated as integral with head 14, such could be a separate member suitably carried by the head or cylinder block and connected to the combustion chamber.

Auxiliary chamber 152 includes an outlet port 164. Outlet port 164 is connected through suitable tubing 166 to a reserve tank 168. The reserve tank includes an atmospheric exhaust outlet tube 170. A relief valve or pressure regulator 172 may be included in the tube 170 to limit the maximum pressure in reserve chamber 168. It is also preferred that a check valve 174 be positioned within the tube 166 so that exhaust gases under pressure will be retained within the reserve tank 168.

The reserve tank therefore becomes a source of pressurized fluid which may be transmitted back to the power piston/cylinder through a bypass tube 176 and a solenoid controlled valve 178 to effect starting of the engine in conjunction with an electric starter which rotates crank 28. Solenoid valve 178 may be connected to a conventional two-position ignition switch which will open the valve when in a "start" position to permit passage of the pressurized fluid from the reserve tank 168 to chamber 152. The charge of fluid entering chamber 152 and subsequently entering the combustion chamber defined by the cylinder head, piston 22 and cylinder 20 insures that a charge is present in the engine to be transferred through the exhaust passage 78 to the underside of the auxiliary piston 54 to effectuate compression and transfer of a fresh charge through passage 76 and intake port 60. In a multi-cylinder construction, it is envisioned that a plurality of chambers 152 may be interconnected or manifolded and the exhaust gases collected thereby employed to propel another power piston connected to crank 28.

ALTERNATIVE EMBODIMENT

An alternative embodiment of a two-cycle internal combustion engine incorporating the auxiliary or expansion chamber in accordance with the present invention is illustrated in FIG. 2 and generally designated 200. Engine 200 includes a cylinder block 202, a cylinder head 204 and a rotary valve means generally designated 206. Cylinder block 202 defines a power cylinder 208 enclosed at its top end by cylinder head 204. A power piston 210 reciprocates within power cylinder 208. Cylinder block 202 also defines a supercharging cylinder or auxiliary cylinder 212 within which a supercharging or auxiliary piston 214 reciprocates. The top of cylinder 212 is similarly closed by cylinder head 204. Engine 200 differs from engine 10 in that the pistons 210, 214 are connected to a single crank shaft through conventional connecting rods 216, 218, respectively. The supercharging piston 214, therefore, is not free floating as in the embodiment illustrated in FIG. 1.

Cylinder head 204 defines an intake port 220 opening into the top of auxiliary cylinder 212. Intake port 220 may be connected to a source of air and fuel, such as a conventional carburetor 222. Cylinder head 204 further defines a charge transfer port or passage 224 extending between supercharging cylinder 212 and power cylinder 208. An exhaust port 226 is defined by cylinder head 204 and communicates power cylinder 208 with atmosphere through an exhaust pipe or manifold 228.

Cylinder head 204 defines a charge expansion chamber 232 positioned above the power cylinder 208. In the embodiment illustrated in FIG. 2, an insert 234 is press fit into the cylinder head to define the chamber. This insert includes a port or passage 236 which opens expansion chamber 232 to the combustion chamber defined by the cylinder head and the power cylinder 208. The use of a separate insert 234 would ease the machining problems encountered with fabricating the engine. In the alternative, chamber 232 could be cast in the cylinder head.

Another expansion chamber 238 is defined by cylinder head 204 above the supercharging cylinder 212. Expansion chamber 238 communicates with chamber 232 through a passage 240 also defined by the cylinder head. It is presently preferred that a variable restrictor 242 be disposed in passage 240. Variable restrictor 242, which is schematically shown, provides varying action to accommodate the use of different fuels. Chamber 238 is illustrated as being cast within the cylinder head 204. In the alternative, a separate insert could be employed such as insert 234 to close off the lower half of the chamber.

Valve means 206 controls the opening and closing of the various ports and passages so that the air/fuel mixture will be drawn into the supercharging piston cylinder 212, compressed and transferred through port 224 to the power cylinder 208 where the charge will be ignited by a conventional spark ignition system (not shown). The power piston 210 will then move downwardly in its power stroke and on its return or exhaust stroke, the valve means will communicate the combustion chamber with atmosphere through port 226.

In the embodiment illustrated in FIG. 2, conventional poppet or reciprocating valves are eliminated and rotary valve discs are substituted therefor. The rotary valve discs overcome the problems experienced with providing ample valve clearance and achieve a more nearly zero clearance between the power piston 210 and the rotary valve which defines the top of the combustion chamber.

The valve means includes a first generally cylindrical rotary valve disc 250 which is associated with the supercharging piston cylinder. Disc 250 is supported above piston 214 within cylinder 212 and immediately adjacent and below the undersurface of cylinder head 204. A rod or shaft 252 extends vertically from disc 250 and is keyed thereto. Rod 252 extends to the top of the cylinder head and has nonrotatably secured thereto a bevel gear 254. Rotation of gear 254 results in rotation of valve disc 250.

As best seen in FIGS. 3, 4 and 5, valve disc 250 includes a generally oblong-shaped groove 256 which extends through the disc and terminates at an opening or port 258. Groove 256 extends around the periphery of disc 250 and controls the intake of the air/fuel mixture from port 220 to the supercharging cylinder. Disc 250 also defines a recess 260 at the lower end thereof which opens through the peripheral circumference of disc 250. Recess 260 when in line with transfer port 224 permits the compressed air/fuel mixture to be transferred from the supercharging cylinder to the power cylinder. Timing and control of the intake and transfer of the fuel mixture is controlled by the length and positioning of the grooves 256, 260 on disc 250.

Figure 6:
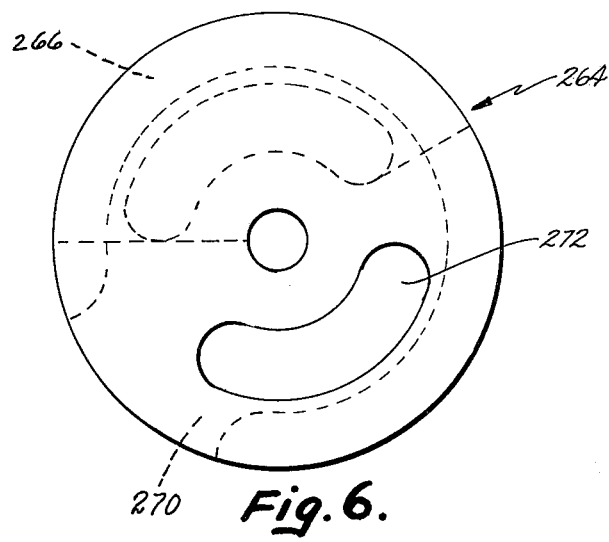
FIG. 6 is a top, plan view of a rotary valve disposed in the power cylinder.
Figure 7:
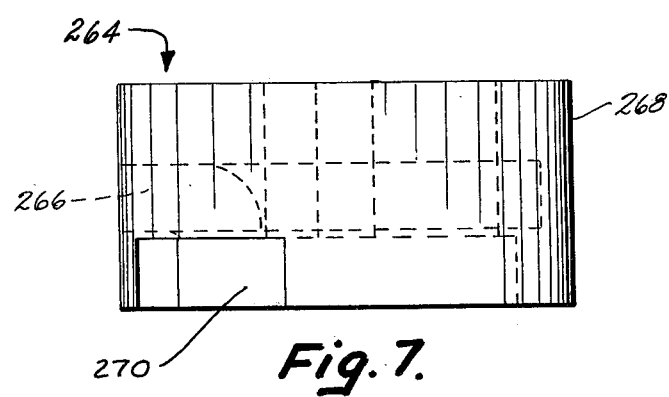
FIG. 7 is a front, elevational view of the rotary valve of FIG. 6.
Figure 8:
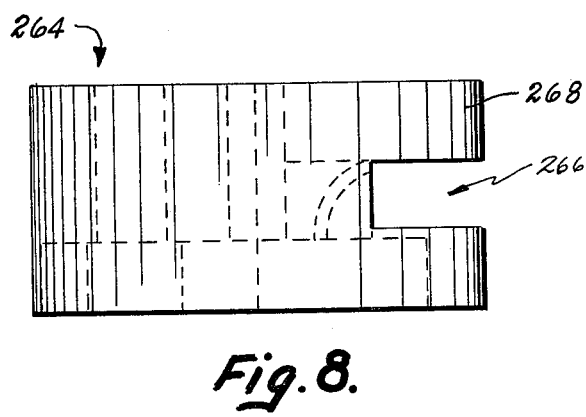
FIG. 8 is a side elevational view of the rotary valve of FIG. 6.

Positioned above power piston 210 within power cylinder 208 is another valve disc 264. Disc 264 is supported for rotary motion by a vertical shaft 265 having a bevel gear 267 keyed thereto. As seen in FIGS. 2 and 6-8, disc 264 includes a peripheral groove 266 opening through the sidewall portion or peripheral circumference 268 of disc 264 and extending around a portion of the periphery of the disc. Groove 266 opens through the sidewall 268 and also extends inwardly and downwardly to open through the lower face of disc 264. Groove 266 when aligned with exhaust port 226, permits the exhaust gases within the power cylinder to exit to atmosphere. Disc 264 includes a second groove 270 which opens through the periphery or sidewall 268 of the disc and also through the bottom of the disc. Groove 270 is arranged on disc 264 and positioned so that it will move into alignment with transfer port 224 when exhaust port 226 is closed to permit transfer of the compressed or supercharged air/fuel mixture from cylinder 212 into the power cylinder 208. As best seen in FIGS. 2 and 6, disc 264 also includes an expansion chamber transfer port or passage 272 of generally arcuate shape. Passage 272 is positioned on disc 264 so that the combustion chamber is spaced above piston 210 and is placed in communication with the expansion chamber 232 during the power stroke of piston 210.

Valve discs 250, 264 are rotated in a counterclockwise direction by a rotation shaft 280 suitably journaled to the top of cylinder head 204. Nonrotatably secured to shaft 280 are a pair of bevel gears 282, 284 which mesh with bevel gears 254, 267 secured to rods 252, 265 of valve discs 250, 264, respectively. A timing chain or belt 286 extends from one end of the shaft 280 to the crank case of the engine.

As illustrated in FIG. 2, pistons 214, 210 have just moved beyond their top dead center positions and an air/fuel mixture is being drawn into cylinder 212 from intake port 220 through passage 256 of valve disc 250. The previously compressed air/fuel mixture has already been transferred to the power cylinder 208 and groove 260 has moved past port 224, thereby closing off the port. Passage 272 of disc 264 has now been placed in alignment with or is beginning to open with port 236 of insert 234. The air/fuel mixture has been ignited by the spark plug and piston 210 is beginning its power stroke.

Disc 264 controls expansion of an overcharge into chamber 232. The structure results in a relatively flat power curve and sustained high pressure. Also, disc 264 serves to cut off the expanding gases at the end of the power stroke, thereby retaining a substantial volume of gas within chamber 232 under pressure until the start of the next power stroke. Each succeeding explosion within the combustion chamber can add to and/or maintain this volume of gas under pressure. Chamber 232 may also be connected to a reserve tank, such as tank 168, as illustrated in FIG. 1.

The engine embodiment illustrated in FIG. 2 permits a significant overcharge of air/fuel mixture to be compressed and transferred to the power cylinder by the supercharging piston cylinder arrangement. The rotary valves eliminate the clearance problems associated with conventional poppet or reciprocating valves. The valving system also eliminates the energy loss inherent in reciprocating rocker arms and the like. As with the engine embodiment illustrated in FIG. 1, the valves insure that exhaust gases will not mix with the incoming charge. In the alternative, it is believed that disc 250 could be modified and additional passages included so that a free floating piston cylinder arrangement would be used in the engine of FIG. 2.

As should now be readily apparent to those of ordinary skill in the art, the unique two-cycle internal combustion engines in accordance with the present invention prevent or substantially eliminate mixing of the exhaust or combustion gases with the fresh charge through the positive valving and the zero clearance or minimal effective clearance volume of the power piston and cylinder head. The mechanical efficiency of the engine is increased due to the supercharging and a delayed or retarded ignition of the charge without significant or power robbing reduction in the pressures within the chamber due to expansion of the combustion chamber volume. Relief chambers 152, 232, when incorporated into the engines, permit the auxiliary piston cylinder arrangement to be designed to transfer a substantial overcharge to the power piston without risk of detonation and/or damage to the engines. Flattening of the power curve of the engine during the power stroke of the power piston, increasing of the average pressure within the cylinder and, hence, the power output should result.

Conventional lubricating systems may be emplpyed with the internal combustion engine in accordance with the present invention. For example, a pump-type oil injection system including outlet nozzles positioned in the walls of cylinder 50 may be employed to lubricate the cylinder walls and reduce the friction between free floating piston 54 and cylinder 50. A pressure-type oil lubrication system may also be employed to lubricate the cylinder walls of cylinder 20 and to lubricate the overhead valve train 16 or rotary valve train 260. Since these subsystems are well known in the art, they have not been illustrated and described in any detail.

Further, the drawings have been simplified to illustrate the inventive concepts in an easily understandable manner. The relationship of the auxiliary piston to the power piston, the number of such pistons and the location and length of the various passages may, of course, vary from that illustrated in actual applications.

In view of the foregoing description, those of ordinary skill in the art will undoubtedly envision various modifications to the embodiment illustrated which would not depart from the inventive concepts disclosed herein. Various types of check valves and variable restrictors may be employed for the elements which have been schematically illustrated. Although the inventive concepts have been disclosed in the context of a single power piston cylinder and a single auxiliary piston cylinder engine, a plurality of such auxiliary and power piston cylinder systems may be interconnected on a single crank, either in an in-line or V configuration.

Therefore, it is expressly intended that the above description should be considered as that of the preferred embodiment only. The true spirit and scope of the present invention may be determined by reference to the appended claims.

The embodiments of the invention in which an exclusive property or privilege is claimed are defined as follows.

1. In an internal combustion engine of the type including at least one power cylinder having a power piston reciprocating therein and which is connected to an output crank, a cylinder head defining a combustion chamber with the power cylinder and said power piston, said cylinder head also defining intake and exhaust ports, the engine further including valve means for controlling the intake of a charge through the intake port and the exhaust of combustion gases through the exhaust port, and supercharging means operatively connected to said intake port for intaking, compressing and transferring a compressed charge to the intake port, the improvement comprises:
   a charge expansion means communicating with said combustion chamber for defining an expansion chamber and for permitting the expansion of the combustion gases out of and in to the combustion chamber as the power piston moves towards bottom dead center so that an overcharge may be transferred to said combustion chamber by said supercharging means.

2. An internal combustion engine of the type defined by claim 1 wherein said charge expansion means defines a port opening into said combustion chamber and further includes a valve extending from said power piston and gradually opening said port as said power piston moves towards bottom dead center on its power stroke.

3. An internal combustion engine of the type defined by claim 2 wherein said valve is a generally bottle-shaped member having a base secured to the top of said power piston, said member tapering from said base to a reduced diameter neck portion.

4. An internal combustion engine as defined by claim 1 wherein said charge expansion means defines an expansion port and further includes a generally cylindrical valve disc having an expansion transfer passage opening therethrough and valve train means operatively connected to said valve disc for rotating the disc to move said transfer passage into line with said expansion port to open said port to said combustion chamber as said power piston moves towards bottom dead center during the power stroke and to close said port at the end of the power stroke to retain a volume of g as under pressure within said expansion chamber.

5. An internal combustion engine as defined by claim 4 wherein said cylinder head defines said expansion chamber of said charge expansion means, said cylinder head defining another expansion chamber and an expansion passage interconnecting said another expansion chamber with said expansion chamber.

6. An internal combustion engine as defined by claim 5 further including a variable restrictor within said expansion passage interconnecting said expansion chambers.

7. An internal combustion engine including a cylinder block defining a power cylinder and a supercharging cylinder, a power piston reciprocating within said power cylinder, a supercharging piston reciprocating within said supercharging cylinder, means for reciprocating said power piston and said supercharging piston, means defining a fuel mixture intake port, a transfer port and an exhaust port, a cylinder head defining a combustion chamber and a compression chamber with said cylinder block, and valve means for controlling the flow of gases through said ports so that said supercharging cylinder intakes, compresses and transfers a fuel mixture to said combustion chamber and for exhausting the combusted mixture from said power cylinder after the power piston completes its power stroke, said valve means comprising:
   a first generally cylindrical disc above said supercharging piston, said disc defining an intake passage placing said intake port in communication with said supercharging cylinder, said disc then closing off said intake port and said disc including a transfer passage for placing said supercharging cylinder in communication with said transfer port after the mixture is compressed within said supercharging cylinder;

a second generally cylindrical disc above said power piston, said second disc including a first passage alignable with said transfer port so that the compressed mixture may enter said power cylinder and a second passage alignable with said exhaust port for exhausting combusted gas from said power cylinder; and drive means for supporting said discs and rotating said discs during operation of said engine.

8. An internal combustion engine as defined by claim 7 further including a charge expansion means communicable with said combustion chamber for defining an expansion chamber and permitting expansion of combustion gases out of and in to said combustion chamber as the power piston moves towards bottom dead center so that an overcharge may be transferred to said combustion chamber by said supercharging piston.

9. An internal combustion engine as defined by claim 8 wherein said cylinder head defines said expansion chamber and said second disc includes an expansion chamber passage for opening said combustion chamber to said expansion chamber as said power piston moves towards bottom dead center on its power stroke and for closing said expansion chamber from said combustion chamber at the end of the power stroke.

10. An internal combustion engine as defined by claim 9 wherein said means for reciprocating comprises a crankshaft operatively connected to both said power piston and said supercharging piston.

11. An internal combustion engine as defined by claim 9 wherein said cylinder head defines another expansion chamber and a transfer passage opening said another expansion chamber with said expansion chamber.

12. An internal combustion engine as defined by claim 10 further including a variable restrictor within said transfer passage opening said another expansion chamber with said expansion chamber.

* * * * *